(12) United States Patent
Waters

(10) Patent No.: US 7,215,324 B2
(45) Date of Patent: May 8, 2007

(54) AUTOMATIC INDICATOR SYSTEM AND METHOD

(75) Inventor: Richard C. Waters, Concord, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 311 days.

(21) Appl. No.: 10/277,758

(22) Filed: Oct. 22, 2002

(65) Prior Publication Data

US 2004/0075646 A1   Apr. 22, 2004

(51) Int. Cl.
G09G 5/08       (2006.01)
(52) U.S. Cl. .................. 345/158; 345/156; 715/856
(58) Field of Classification Search ........... 345/156, 345/158, 856, 858, 179, 180, 182; 715/856, 715/858
See application file for complete search history.

(56) References Cited

U.S. PATENT DOCUMENTS

| 4,280,135 A | * | 7/1981 | Schlossberg ............... 348/61 |
| 6,094,189 A |   | 7/2000 | Quillen et al. ............. 345/158 |
| 6,292,584 B1 | * | 9/2001 | Dulaney et al. ........... 382/151 |

* cited by examiner

*Primary Examiner*—Jimmy H. Nguyen
(74) *Attorney, Agent, or Firm*—Dirk Brinknon; Clifton D. Mueller

(57) ABSTRACT

An automatic indicator system directs a light beam at an object. A camera configured to acquire an image of an object is coupled to a light beam indicator. The image is compared with representations of objects stored in a database. A matching representation is identified and the light beam is directed at the object based on information associated with the matching representation.

6 Claims, 2 Drawing Sheets

AUTOMATIC INDICATOR SYSTEM AND METHOD

FIELD OF THE INVENTION

The invention relates generally to indicator devices, and more particularly to automatically directing a light beam at an object.

BACKGROUND OF THE INVENTION

Light beam pointer devices such as laser pointers are used as a tool for a number of purposes such as highlighting aspects of slide presentations and directing attention to aspects of real world objects for instructional purposes. Handheld laser pointers have become increasingly popular in recent years for use by instructors to point out detail on projected slides and the like, see for example, U.S. Pat. No. 5,450,148 to Shu, et al.

Image processing and data transmission technology enable remote display of images marked by laser pointers. U.S. Pat. No. 4,280,135 to Schlossberg describes a remote pointing system where a user directs a laser pointer at a locally projected image. The local image, including the laser point, is then transmitted to, and displayed at a remote location. However, in Schlossberg, the user must manually direct the laser at the local image to display the laser point at the corresponding location in the remote image.

U.S. Pat. No. 6,094,189 describes an apparatus for directing a laser pointer located remotely by a user at a local location. There, the user views an image of the remote location in order to direct the remotely located laser pointer.

Image processing systems for detecting and recognizing objects in scenes are also well known. Typically, a camera acquires an image of the object, and a vision system connected to the video camera detects and recognizes the object in the image, see, e.g., Dulaney et al. U.S. Pat. No. 6,292,584.

It is desired to provide a system that can automatically direct a laser pointer at an object.

SUMMARY OF THE INVENTION

The invention provides an automatic indicator system for directing a light beam at an object. A camera configured to acquire an image of an object is coupled to a light beam indicator. The image is compared with representations of objects stored in a database. A matching representation is identified and the light beam is directed at the object based on information associated with the matching representation.

DETAILED DESCRIPTION OF THE PREFERRED EMBODIMENT

System Structure

Figure 1:
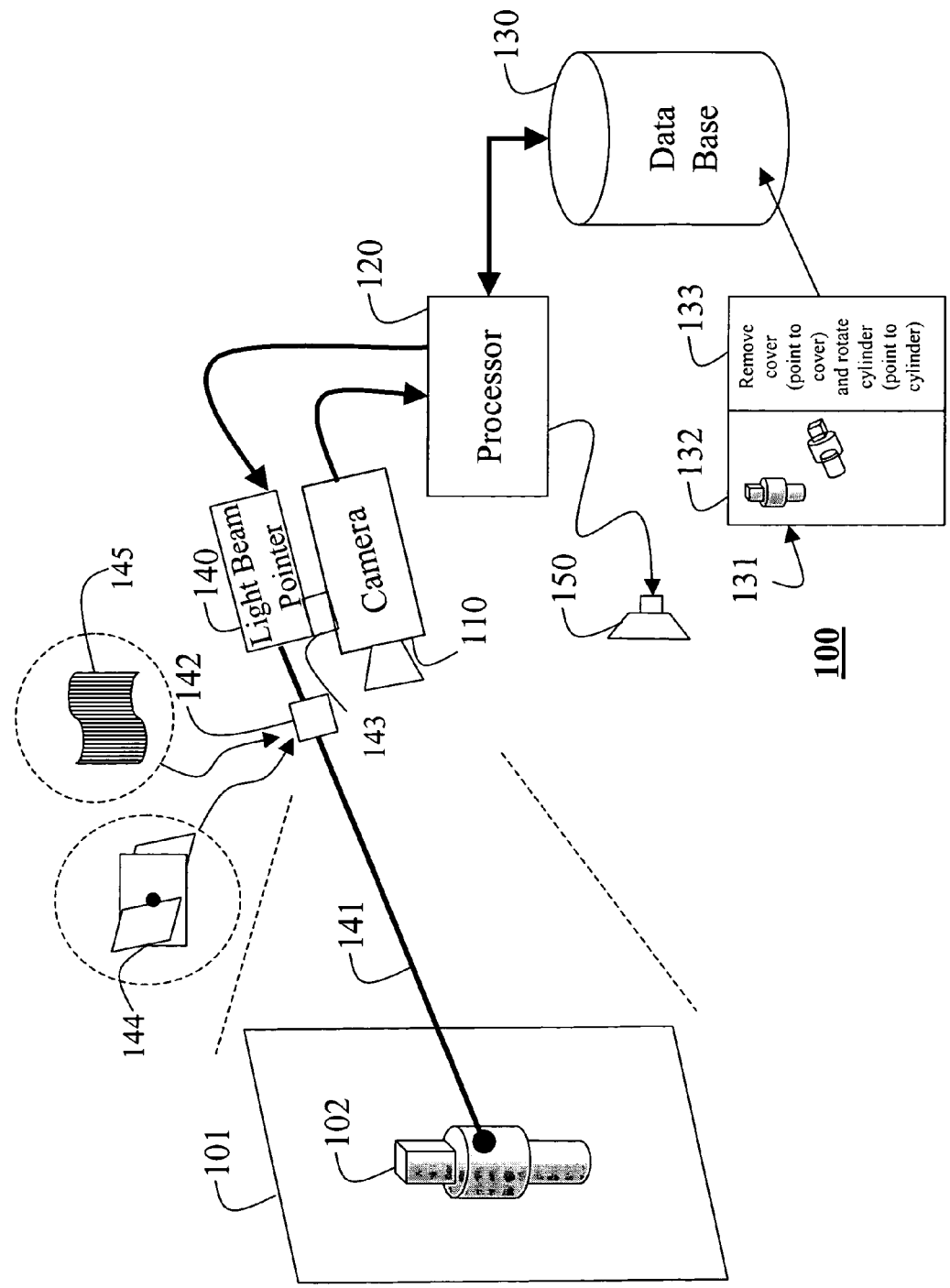
FIG. 1 is block diagram of an automatic indicator system according to the invention.

FIG. 1 shows an automatic indicator system 100 according to the invention. The system 100 includes a camera 110, a processor 120, a database 130, and a light beam pointer 140 connected to each other.

The camera 110 acquires images, in analog or digital form, of a scene 101 including an object 102. The images can be acquired in the visible or infra-red range of the electromagnetic spectrum, for example. There can be more than one camera connected to the system 100.

The processor 120 is substantially conventional, including a microprocessor, memory, and I/O interfaces and peripheral devices, coupled to each other. The microprocessor executes operating and application programs that implement an automatic indicator method according to the invention, as described in greater detail below with reference to FIG. 2.

The database 130 stores records 131 associated with the objects 102. Each record 131 includes a set of representations 132 of the object 102 and information 133 associated with the object. The representations 132 can be in the form of images, 2D graphic models or 3D graphic models of the object. The information 133 can be, for example, instructions on operation or repair of the object 102, as well as dimensional information. The database can be connected directly to the processor 120, or accessible remotely via a communications link.

The light beam pointer 140 is configured in such a way that the light beam 141 and the optical axis of the camera 110 are substantially aligned, e.g., the pointer 140 is mounted on the camera, or in the camera for greater alignment. When mounted in the camera, the light beam may be reflected off a half silvered mirror though the lens of the camera.

The light beam can be directed using a steering mechanism 142, which can be, for example, gimbaled mirrors 144, warp-able diffraction gratings 145 or the like for directing the light beam. Alternatively, the light beam pointer can be mounted on gimbals 143 and steered.

Figure 2:
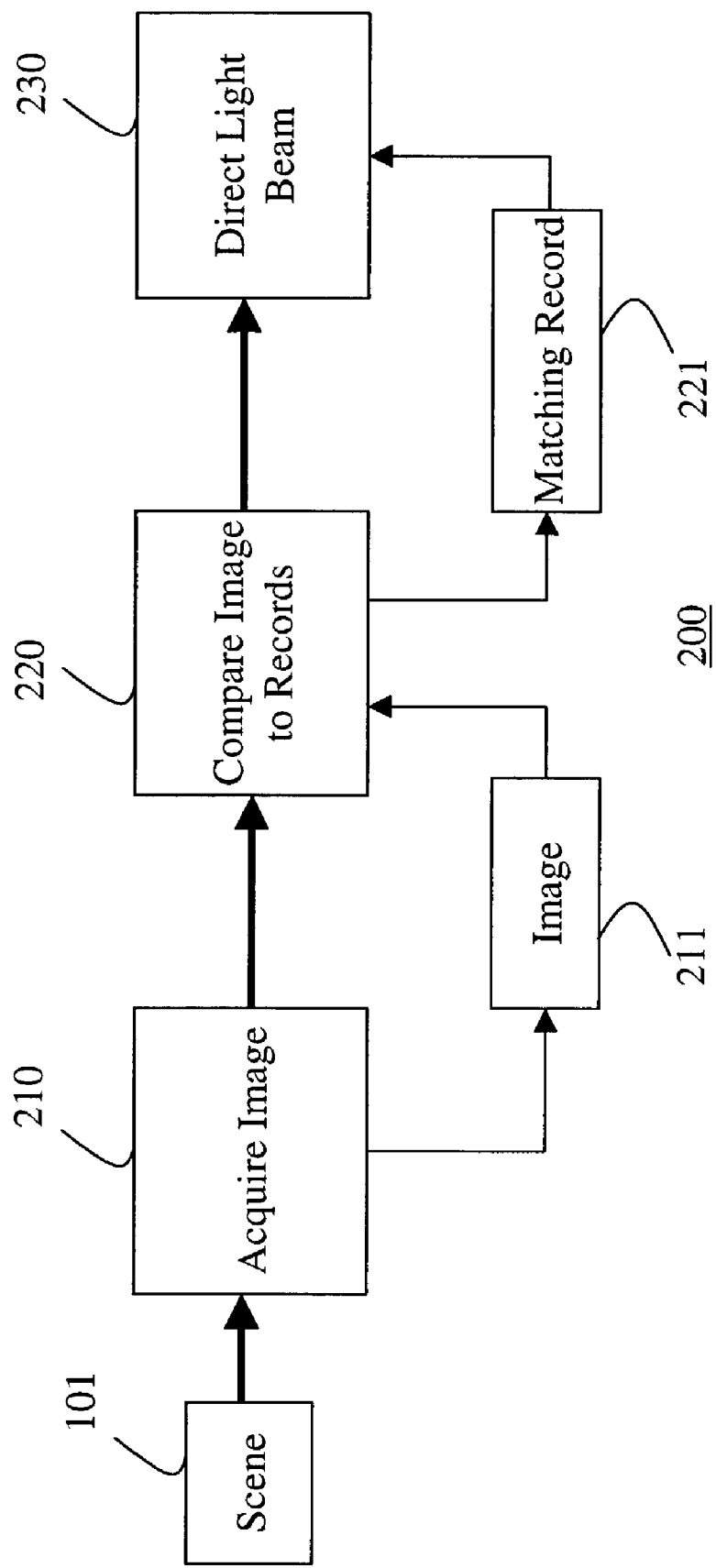
FIG. 2 is flow diagram of an automatic indicator method according to the invention.

FIG. 2 shows the operation 200 of the system 100 according to the invention. The camera 110 acquires 210 an image 211 of the scene 101. The processor 120 compares 220 the acquired image 211 to the representations 132 in the records 131 stored in the database to identify a matching record 221. Using the steering mechanism 142, the processor 120 directs 230 the light beam 141 to locations on the object 102 based on the representations 132 and associated information 133. The associated information can be, for example, a set of instructions for operating or repairing the object 102. Optionally, the system can include an audio output device 150 for playing back associated recorded information in audio form.

In order for the system to work properly when hand held, it dynamically corrects for any changes in the position of the system with respect to the object. The correction uses features of the object 102, such as corners, edges or fiducial marks to determine a relative position between the object, the laser and the camera.

The invention can also be used in a remote operational mode where one system is used locally to point at an object and a remote system points at a corresponding place on a remote object.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

What is claimed is:

1. An automatic indicator system for directing a light beam at an object, comprising:
   a camera configured to acquire an image of an object;
   a light beam indicator coupled to the camera;

means for comparing the image with a plurality of representations of a plurality of objects stored in a database;

means for identifying a matching representation from the plurality of representations;

means for directing the light beam at the object based on information associated with the matching representation, in which the associated information is audio information; and an audio output device configured to play back the associated information.

2. The automatic indicator system according to claim 1 further comprising:

means for correcting a location of the light beam on the object in response to determining a relative position of the camera with respect to the object.

3. The automatic indicator system according to claim 1 wherein the means for directing the light beam is a gimbaled mirror.

4. The automatic indicator system according to claim 1 wherein the means for directing the light beam is a warpable diffraction grating.

5. The automatic indicator system according to claim 1 wherein the light beam indicator is mounted on the means for directing the light beam.

6. A method for directing a light beam at an object comprising:

acquiring an image of an object;

comparing the image to a plurality of representations of a plurality of objects stored in a database to identify a matching representation;

directing the light beam at the object based on information associated with the matching representation; and outputting information associated with the matching representation in audio form.

* * * * *